Dec. 1, 1953 C. L. OSTERKORN 2,660,945
DAMPER CONTROL MEANS FOR AIR CONDITIONING UNITS
Filed March 2, 1950 3 Sheets-Sheet 1
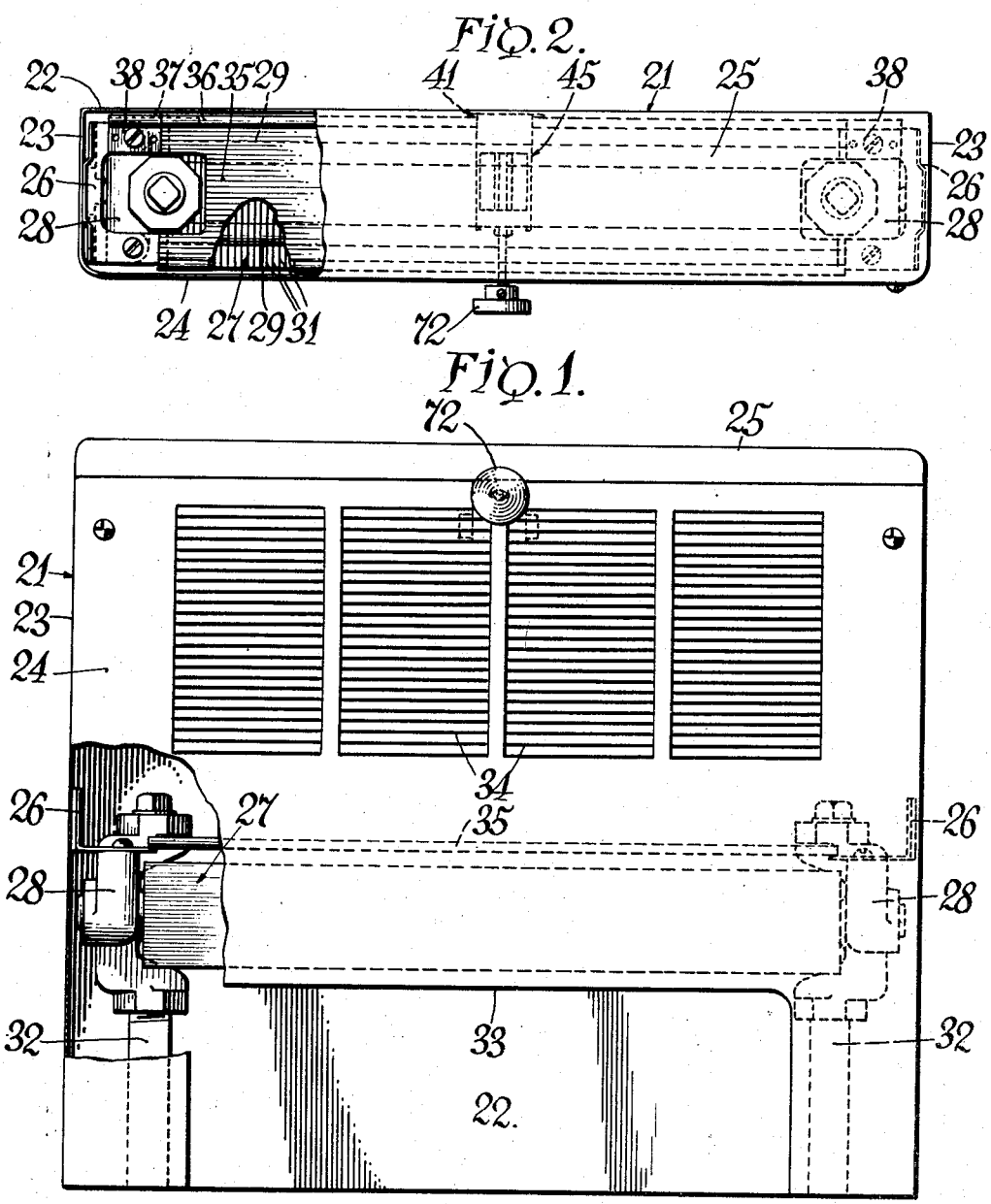
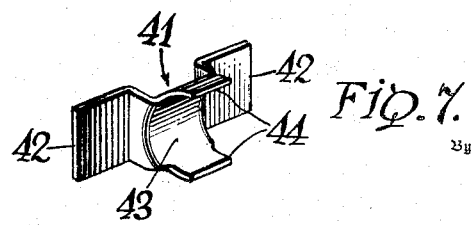
Fig. 7.
Inventor
Charles L. Osterkorn,
By Albert R. Henry
Attorney Dec. 1, 1953  C. L. OSTERKORN  2,660,945
DAMPER CONTROL MEANS FOR AIR CONDITIONING UNITS
Filed March 2, 1950  3 Sheets-Sheet 2
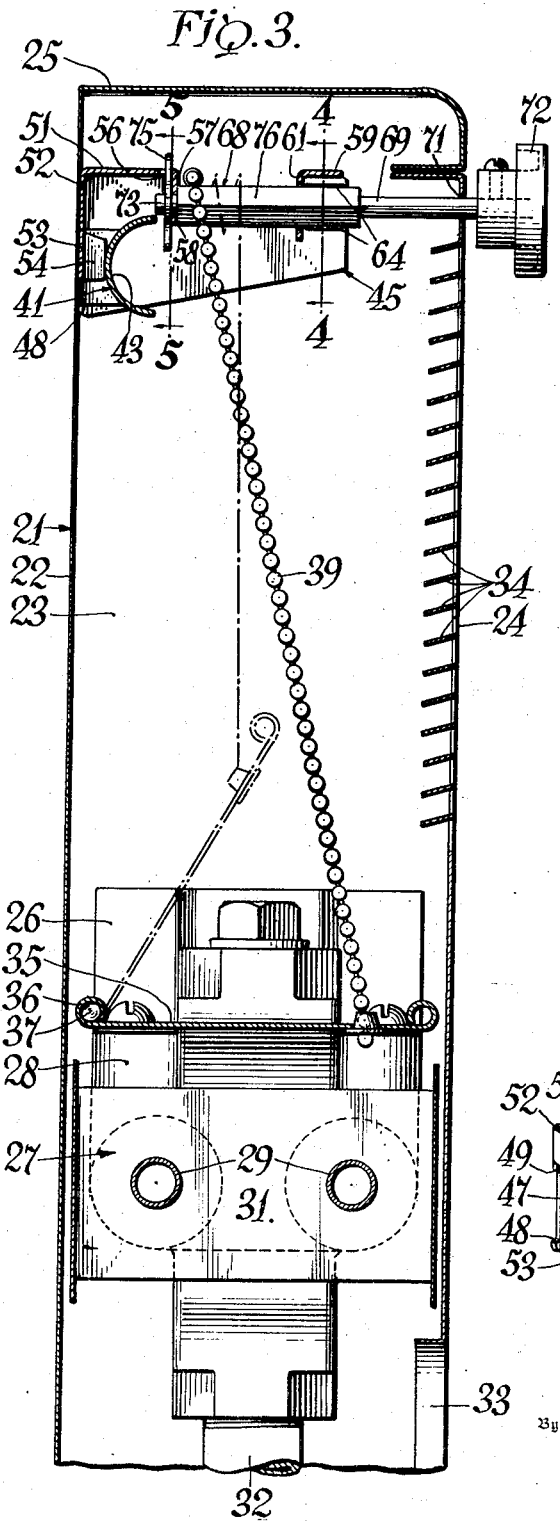
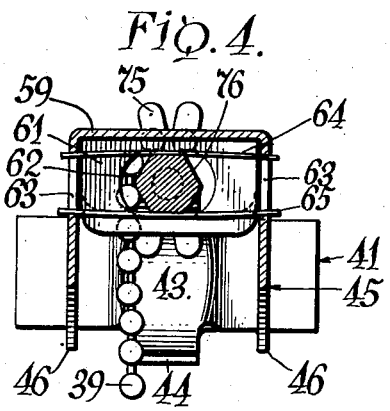
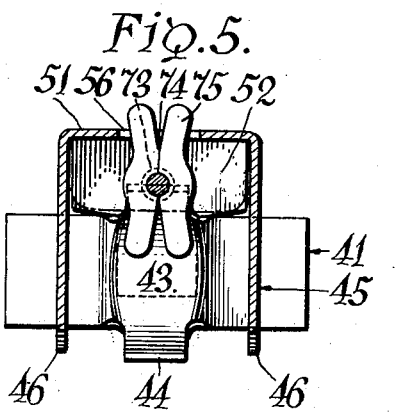
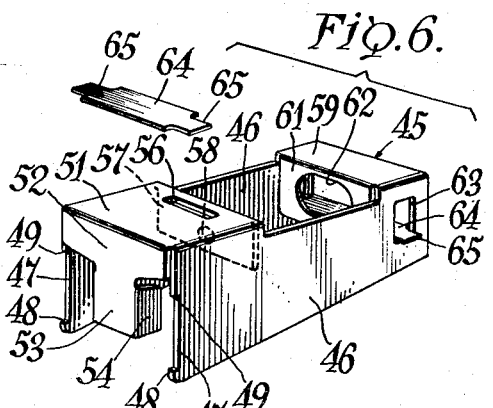
Inventor
Charles L. Osterkorn,
By
Albert R. Heinrich
Attorney

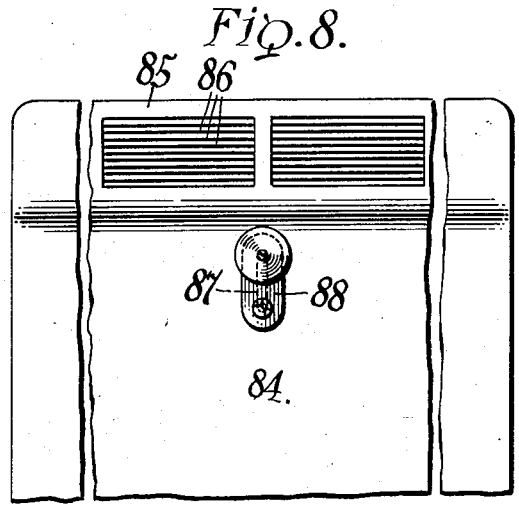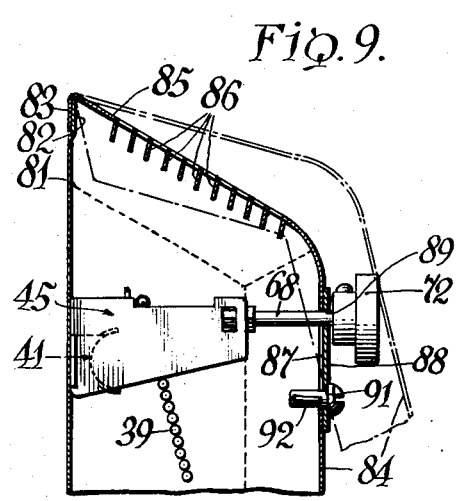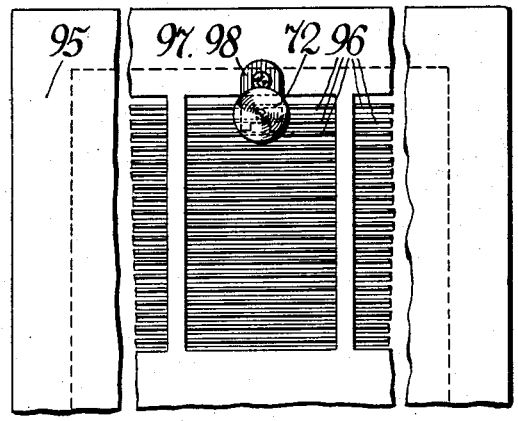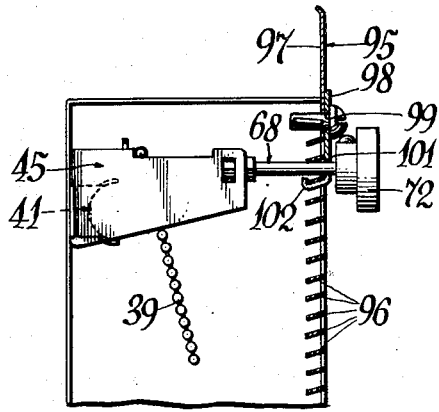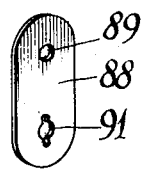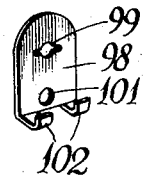

Patented Dec. 1, 1953

2,660,945

UNITED STATES PATENT OFFICE 2,660,945

DAMPER CONTROL MEANS FOR AIR CONDITIONING UNITS

Charles L. Osterkorn, Flushing Heights, N. Y., assignor to Fedders-Quigan Corporation, Buffalo, N. Y.

Application March 2, 1950, Serial No. 147,213

6 Claims. (Cl. 98—41)

1

This invention relates to a damper control means for air conditioning units, and it has particular reference to the provision of a polygonal shaft and bearing bracket therefor for shifting a damper, ventilating closure, or the like, to any of a number of alternative positions. The invention provides a simple and reliable controlling member which can be readily applied to units already installed, as well as to equipment in the course of fabrication.

The invention will hereinafter be described as applied to casings for apparatus for heating air in rooms, such as are commonly termed convectors, although it will be understood that the invention is also applicable to room cooling apparatus, and it may be utilized with ventilating or proportioning dampers, as well as those whose primary purpose is to regulate the heat transfer to the circulating air.

The principles of the invention, and the advantages to be derived from the practice thereof, will be made apparent from the following description, in which reference is made to the accompanying drawings, wherein:

Fig. 1 is a front elevation of an encased convector, parts being broken away;

Fig. 2 is a top plan, again with parts broken away;

Fig. 3 is an enlarged medial section;

Figs. 4 and 5 are additionally enlarged sections taken on the lines 4—4 and 5—5 respectively of Fig. 3;

Fig. 6 is a perspective of the shaft bearing bracket of the control device;

Fig. 7 is a perspective of a supporting bracket therefor;

Fig. 8 is a fragmentary front elevation of a different style of casing, wherein the air louvers are formed in a sloping top;

Fig. 9 is a section through the casing of Fig. 8, showing the control means as applied thereto;

Fig. 10 is a fragmentary front elevation of another style of casing;

Fig. 11 is a section through the casing of Fig. 10, also showing the control means as applied thereto; and, Figs. 12 and 13 are perspectives of medallion bearing members employed respectively with the casings of Figs. 8 and 10.

The convector shown in Figs. 1, 2, and 3 comprises an upright sheet metal casing 21 having a rear wall 22, end walls 23, a removable front wall 24, and a cover or top 25. The end walls 23 are provided with angle brackets 26 which support a convector coil 27 composed of end

2 manifolds 28, fluid conducting tubes 29 extending therebetween, and transversely disposed vertically positioned spaced fins 31 through which the tubes extend. Steam or hot water may be circulated through the coil through pipe connections 32, and air may circulate around the tubes and between the fins by natural draft or convection. The air enters the casing below the coil 27 through a recess or opening 33 formed in the lower portion of the front wall 24, and emerges through a plurality of louvers 34 formed in the upper portion of the front wall.

The flow of air may be regulated by means of a damper, herein shown as a flat plate 35 formed with a rolled edge 36 adapted to receive a hinge pin 37, the ends of which are mounted in keepers 38 formed on the brackets 26. The damper is thus mounted to rest over the upper edges of the fins 31, as shown in the drawing, thereby substantially blocking all air flow, and minimizing the transfer of heat. As thus far described, the apparatus is of an old and well known type. It is also old to operate overhead dampers by means of a cord or pull chain 39, attached to the free edge of the plate 35, and extending through any convenient point of the casing, as for example, a keyhole slot formed in the top wall. As noted at the outset, the present invention is directed to an improved control mechanism.

As shown in the perspective, Fig. 7, the control assembly includes a supporting bracket 41, formed from sheet metal to have a pair of lateral flanges 42 disposed in a common plane, and offset from a central arcuate portion 43 having forwardly extending tips 44. The flanges 42 are joined to the rear wall 22 so that the tips 44 point toward the front wall 24 adjacent the upper portion of the louvers 34, as shown in Fig. 3. It will be noted that the bracket 41 is reversible; that is, it can be installed with either of the tips 44 uppermost. The supporting bracket 41 is adapted to receive a second bracket, herein termed the bearing bracket, and designated generally by the reference numeral 45. This bracket is shown in perspective in Fig. 6.

The bracket 45 is so proportioned as to be susceptible of fabrication by stamping a single piece of sheet metal. It comprises a pair of side rails 46, the rear ends of which are formed with shallow notches 47 of substantially the same length and depth as the width and thickness of the supporting bracket flanges 42, thereby providing lugs 48 and 49 which may engage over the edges of such flanges. A web 51 connects the rails 46 at the upper rear edges thereof, and it merges into a depending flange 52 whose surface lies in the plane of the rear ends of the side rails. The flange 52 is cut away at its sides, and the central depending portion 53 thereof is bent to provide two forwardly projecting tabs 54.

It will be seen from a consideration of Figs. 3, 6, and 7 that the bearing bracket 45 may be connected to and secured by the supporting bracket 41 after the latter has been secured to the wall 22. The depending portion 53 is slipped into the clearance gap behind the arcuate portion 43, and the ends of the side rails 46 are slid over the faces of the flanges 42 until the lugs 48 and 49 snap over the edges of such flanges. At the same time, the tabs 54, which are made of the right length for this purpose, slide through the clearance gap with some camming action over the arcuate portion 43, and come to rest in engagement therewith as the flanges 42 seat in the notches 47. The bracket 45 is thus securely held in place and it has substantially no freedom of motion, although it can be readily removed by prying with a screwdriver or the like around the lugs 48.

The forward portion of the web 51 is formed with an access slot 56 and with a depending flange 57 which in turn is formed with a shaft bearing aperture 58. The forward sections of the side rails 46 are also bridged by a web 59 from which is bent down a flange 61 formed with an oval aperture 62. The rails 46 are pierced with substantially rectilinear openings 63. These receive leaf springs 64 having reduced ends 65 which pass through the openings and which, when snapped in place, are restrained from lengthwise displacement by the inner surfaces of the rails 46.

The bracket 45 provides a bearing block for a shaft 68 having a forward cylindrical section 69, which projects through an aperture 71 in the casing wall 24 to receive an operating knob 72. The opposite end 73 of the shaft 68 is also cylindrical, and it is rotatably mounted in the bearing aperture 58. The end 73 underlies the web 51, and it is formed with a reduced portion 74 to which is connected a split thrust and retaining washer 75, inserted through the slot 56 after the shaft 68 is located. The intermediate portion 76 of the shaft 68 is polygonal, and is herein shown as having a hexagonal section. The end of this section, being of greater diameter than the bearing aperture 58, also provides a thrust bearing with the flange 57. Opposite faces of the forward portion of the section 76 bear firmly against, and slightly bow and stress, the leaf springs 64, which constitute a combined bearing and yieldable clutch. Thus, when the knob 72 is manually turned, the edges of the section 76 will flex the springs 64, but when the flat surfaces are in contact, the springs 64 serve to hold them against adventitious rotation.

It will thus be seen that the shaft 68 may be rotated in either direction in increments of sixty degrees. This rotation is employed to control the positioning of the damper 35, by connecting the flexible cable or chain 39 to the polygonal portion of the shaft, so that the chain may be wound up or payed out, windlass fashion, as will be readily understood by inspection of the full and broken line positions in Fig. 3. The engagement of the shaft surfaces with the springs, and the resistance of the springs, retains the damper 35 in any desired position, even though its weight imposes torque on the shaft. Inasmuch as rotation of only sixty degrees may be made to correspond to a much smaller arcuate movement of the damper 35 about its axis on the hinge pin 37, it will be apparent that very close regulation and control of the damper opening may be obtained. It will also be noted that by forming an elongated opening 62 in the flange 61, the shaft 68 may be swung laterally a limited extent so as to correct for minor misalignments between the bearing 58 and the casing opening 71. When the front wall 24 is attached, the aperture 71 then serves as an additional positioning and supporting bearing for the shaft.

It is believed that the advantages and functioning of the invention have been made apparent from the foregoing description. Obviously, in some instances, such as in factory installations on original equipment, the bracket 45 could be directly secured to the wall 22. However, the retention of the bracket 41 is advantageous, as it permits the removal of the bracket 45 in the field, should such removal be later desired. When casings are installed without the shaft control mechanism, the provision of the bracket 41 enables a later installation of the bracket 45 to be made with a minimum of tools and effort.

The remaining views show fragmentarily other types of casings or cabinets, again substantially conventional, to which the present improvements may be readily applied. As shown in Figs. 8 and 9, the heat exchange unit is housed in a casing having a rear wall 81 formed with an inwardly offset upper margin 82, over which is hooked the depending flange 83 of a front cover or wall 84. The cover 84 is formed with a sloping top 85 having louvers 86 formed therein, and, as shown by broken lines, the cover is attached or removed by swinging it. It will be apparent that to position such a cover over the end of the shaft 68, it is desirable to cut a slot 87 at an appropriate point in the front wall 84, to obtain the necessary clearance.

Having provided such slot 87, so that the shaft and bearing unit hereinabove described may be utilized, there is also provided a bearing medallion 88, formed with a circular bearing aperture 89 and a second aperture 91 for the reception of a screw or other securing means. After the cover 84 is positioned, the medallion 88 is brought over the slot 87, with the aperture 89 encircling the projecting end of the shaft 68. A fastener 92 is then inserted through the aperture 91 and the lower portion of the slot, to retain the medallion in place and to provide an additional bearing for the shaft 68. The removable knob 72 is then secured to complete the assembly.

The casing shown in Figs. 10 and 11 comprises a rectilinear cabinet having a removable front wall 95, provided with louvers 96 adjacent its upper portion, and with a marginal flange 97 serving as a framing molding when the cabinet is recessed into the room wall. Due to the location of the louvers, the shaft 68 will pass therebetween, and its outer end will not be supported against sideways or horizontal thrust, if it has even some support against vertical thrust. This is analogous to the condition created by the slot 87, in that the shaft passes through an elongated aperture which does not form a bearing. Accordingly, there is provided the bearing medallion 98 shown in perspective in Fig. 13. It is provided with securing and bearing apertures 99 and 101 respectively, and with a pair of hook fingers 102 along its lower edge. These fingers are snapped under the edge of one of the louvers 96, the end of the shaft 68 is passed through the bearing aperture 101, and a fastener is inserted in the aperture 99 and into the wall 95.

It will thus be seen that the invention may be utilized in various types and styles of casings such as are employed to house convectors and other heat exchange apparatus, and that, where the nature of the casing design does not readily admit of a bearing being formed directly in the front wall, auxiliary bearings may be provided to support the shaft adjacent the control knob. It will also be apparent that the invention is subject to numerous modifications and variations without departure from its principles, and therefore it is intended that it be accorded a scope commensurate with the following claims.

I claim:

1. In a casing for a heat exchange apparatus, a pair of spaced walls, a supporting bracket secured to one of said walls and within the casing, said supporting bracket having lateral flanges adapted to abut said wall and a central forwardly offset portion between the flanges, a bearing bracket mounted on said supporting bracket, said bearing bracket having spaced interconnected side rails formed with shallow notches on the rear ends thereof, said notches being of such size as to fit snugly over the flanges of the supporting bracket, a centrally disposed depending tab piece connected to and between said side rails and adapted to enter between said one wall and said offset portion of the supporting bracket in bearing engagement therewith, whereby the bearing bracket may be tightly connected to the supporting bracket within said casing, bearing means formed on the bearing bracket, a shaft mounted in said bearing means, means engaging the shaft to restrain it from axial displacement, said shaft extending through the other of said walls for manual accessibility and operation, means on the bearing bracket engaging said shaft to resist free rotation thereof, and movable means within the casing and connected to the shaft for operation thereby.

2. In a casing for a heat exchange apparatus provided with a damper, a pair of spaced walls, a bearing bracket mounted within the casing and connected to one of said walls, said bracket having spaced interconnected side rails, means connected to the rails for attaching said bearing bracket to said wall, bearing means connected to and between said rails, a shaft mounted in said bearing means, means connecting said shaft and said damper whereby rotation of the shaft imparts motion to the damper, yieldable means carried by said bracket and engaging said shaft to prevent free movement thereof by the damper, the other of said walls being formed with an elongated aperture, said shaft having one end extending through said aperture, a medallion bearing plate detachably mounted on said wall and formed with a bearing engaging and supporting said shaft, said other wall being removable from said casing, and means engaging the shaft to restrain it from axial displacement.

3. In a casing for a heat exchange apparatus provided with a substantially horizontal damper, a wall for the casing extending above the damper, a bearing bracket supported on said wall, said bearing bracket having spaced side rails, a web member above said rails interconnecting the same, a bearing plate disposed between and connected to said rails, a shaft rotatably mounted in said bearing plate, said shaft having one end extending through said casing, means engaging the shaft to restrain it from axial displacement, a flexible cable connected to the damper and shaft and adapted to be wound around the shaft as the shaft is rotated thereby to move the damper against the weight thereof, and yieldable means carried by the rails and engaging the shaft, said yieldable means imposing sufficient resistance to the rotation of the shaft to overcome the rotational force imparted by the weight of the damper.

4. A bracket and shaft mechanism adapted for use in a cabinet or the like comprising a bearing bracket having a pair of spaced interconnected side rails, a depending tab disposed between and connected to said side rails at one end thereof, a bearing flange disposed between and connected to the side rails in spaced relation to said depending tab, said bearing flange being formed with a shaft bearing aperture, said side rails being formed with aligned substantially rectilinear openings at a point spaced from said bearing flange, flat leaf springs having portions disposed in said openings and extending between the rails, a shaft having a cylindrical portion journalled in said bearing aperture and extending lengthwise between said side rails and beyond said openings, said shaft adjacent said openings having a polygonal cross section bounded by a plurality of pairs of diametrically opposed parallel surfaces, said springs normally engaging a pair of said surfaces and being stressed thereby, and means engaging the shaft to restrain it from axial displacement.

5. A bracket and shaft mechanism adapted for use in a cabinet or the like comprising a bearing bracket having a pair of spaced side rails, webs interconnecting said rails along one edge thereof and adjacent the ends of the bracket, a bearing flange depending from one of said webs and between the rails, said bearing flange being formed with a shaft bearing aperture, a second flange depending from the other of said webs and between the rails, said second flange being formed with an elongated opening, a shaft having a cylindrical end portion journalled in said bearing aperture and extending lengthwise of the rails and through the elongated opening, said shaft at the region of said opening having a portion of polygonal cross section and having a major diameter less than the minor diameter of the opening, whereby the shaft may be rotated and shifted a limited extent sideways in said opening for adjustment purposes, and leaf springs carried between and by the side rails adjacent said opening in stressed engagement with opposite surfaces of said polygonal shaft portion, and means engaging the shaft to restrain it from axial displacement.

6. A bracket and shaft mechanism adapted for use in a cabinet or the like comprising a bearing bracket having a pair of spaced side rails, webs interconnecting the rails along one edge thereof and adjacent the ends of the bracket, a mounting flange connected to the side rails at one end thereof, a bearing flange connected to the side rails and therebetween and spaced from the mounting flange, said bearing flange being formed with a bearing aperture, a shaft having a reduced cylindrical end portion journalled in said aperture, a thrust washer encircling the end of the shaft to restrain endwise movement of the shaft in one direction, said cylindrical shaft portion merging into a polygonal portion of greater diameter closely adjacent the opposite side of the bearing flange, thereby to provide a thrust bearing restraining endwise movement of the shaft in the opposite direction, aligned openings formed in the side rails adjacent the other web, the polygonal portion of the shaft extending to said aligned openings, flat leaf springs extending between the aligned openings and engaging opposite surfaces of said polygonal portion, said springs having reduced ends projecting through said aligned openings, said springs being bowed and stressed by engagement with said aligned openings and said surfaces, said shaft being formed with a portion extending beyond said bracket, the space between said rails along the edges opposite said webs being substantially open to provide an entrance way for a flexible cable adapted to be connected to said polygonal portion and wound thereon as the shaft is rotated.

CHARLES L. OSTERKORN.

References Cited in the file of this patent

UNITED STATES PATENTS

| Number | Name | Date |
|---|---|---|
| 509,332 | Smith | Nov. 21, 1893 |
| 639,095 | Roseman | Dec. 12, 1899 |
| 1,199,764 | Coffin | Oct. 3, 1916 |
| 1,983,711 | Smith, Jr. et al. | Dec. 11, 1934 |
| 2,357,940 | Du Lude | Sept. 12, 1944 |
| 2,407,837 | Kissel | Sept. 17, 1946 |
| 2,491,315 | Johnson | Dec. 13, 1949 |